US009119273B2

(12) United States Patent
Gergely et al.

(10) Patent No.: US 9,119,273 B2
(45) Date of Patent: Aug. 25, 2015

(54) COMPACT FLUORESCENT LAMP THREE-WAY BALLAST DRIVER

(71) Applicant: General Electric Company, Schenectady, NY (US)

(72) Inventors: Jácint Gergely, Budapest (HU); Gábor Szabó, Budapest (HU); Loránd Lehel Tóth, Dunakeszi (HU); Lajos Csibi, Erd (HU); Tamás Vásárhelyi, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/088,968

(22) Filed: Nov. 25, 2013

(65) Prior Publication Data

US 2015/0145428 A1   May 28, 2015

(51) Int. Cl.
*H05B 41/14* (2006.01)
*H05B 41/282* (2006.01)

(52) U.S. Cl.
CPC .................................. *H05B 41/282* (2013.01)

(58) Field of Classification Search
CPC ............... H05B 41/28; H05B 41/2828; H05B 41/2856; H05B 41/42; H05B 41/232; Y02B 20/19
USPC ...... 315/205, 56, 58, 200 R, 209 R, 244, 278, 315/291, 307, DIG. 4, DIG. 5, DIG. 7
See application file for complete search history.

(56) References Cited

U.S. PATENT DOCUMENTS

| 4,178,538 | A |  | 12/1979 | Kelly, III |
|---|---|---|---|---|
| 4,443,740 | A |  | 4/1984 | Goralnik |
| 5,111,114 | A | * | 5/1992 | Wang ............................ 315/225 |
| 5,719,471 | A | * | 2/1998 | Kachmarik ............... 315/209 R |
| 6,064,155 | A | * | 5/2000 | Maya et al. ..................... 315/56 |
| 6,072,284 | A | * | 6/2000 | Lin ................................ 315/307 |
| 6,118,217 | A | * | 9/2000 | Hammer et al. ................ 315/58 |
| 6,222,326 | B1 | * | 4/2001 | Moisin ...................... 315/209 R |
| 6,271,635 | B1 |  | 8/2001 | Daniel |
| 6,459,204 | B1 | * | 10/2002 | Yan ................................ 315/58 |
| 8,901,842 | B2 | * | 12/2014 | Roberts ......................... 315/248 |
| 2007/0217093 | A1 | * | 9/2007 | Xue et al. ........................ 361/18 |
| 2012/0313728 | A1 | * | 12/2012 | Cairo, Jr. ...................... 333/174 |

\* cited by examiner

*Primary Examiner* — Haissa Philogene
(74) *Attorney, Agent, or Firm* — GE Global Patent Operation; Peter T. DiMauro

(57) ABSTRACT

A compact fluorescent lamp (CFL) ballast driver includes first, second and neutral AC voltage terminals, a full wave rectifier between the first AC voltage terminal and the neutral AC input terminal, and a separate branch between the second AC voltage terminal and the neutral AC input terminal. A resonator circuit includes at least two inductors and provides its output voltage to a CFL lamp. The driver includes a first state detector circuit to monitor the first AC voltage terminal, and a second state detector circuit to monitor the second AC voltage terminal. The first and second state detector circuits activate respective first and second switches. The first switch shunts one inductor of the resonator circuit, and the second switch shunts another inductor of the resonator circuit. The driver can be housed in a CFL having a capper, a three-way lamp base adjacent to the capper and an arc tube.

14 Claims, 5 Drawing Sheets

COMPACT FLUORESCENT LAMP THREE-WAY BALLAST DRIVER

BACKGROUND

A typical incandescent three-way lamp produces three levels of light intensity (i.e., low, medium, and high) using two lamp filaments within the same optical housing. The two filaments are typically of different wattages. For example, one lamp filament can be a low wattage filament, and the other filament can be a high wattage filament.

Conventionally, these two filaments are connected in parallel to the lamp base. The lamp base itself has two contacts and a neutral contact. Each of the filaments operates at full voltage when activated.

Proper installation of the three-way lamp is achieved by using a three-way lamp socket, which has three contacts instead of the usual two for a single filament lamp. This third contact is typically off center in the bottom of the socket, and makes contact with the second filament circuit.

The three-way lamp is controlled using a three-way switch, which itself has four positions. Starting from the 'off' position, the switch can sequentially connect power to one filament (typically the lower wattage filament,), then the other filament, and then both filaments.

A standard compact fluorescent lamp does not typically provide three levels of lighting when connected to a three-way switch. Instead the standard compact fluorescent lamp can be modified to include two different arc tubes in parallel to the lamp base, where each of the arc tubes operates at full lumen output when activated by the three-way switch. This dual arc tube solution requires two ballasts, one to drive each of the arc tubes.

BRIEF DESCRIPTION

In accordance with embodiments, a ballast driver provides three-way level control of the compact fluorescent lamp (CFL) lumen output. The driver can include a CFL ballast, which has an autotransformer as the main inductor. The driver also can include a sensor and a switch network. The sensor is configured to detect the output level selection made by a user. The switch is responsive to the detected output level selection and connects taps of the autotransformer to the CFL based on the detected selection. In one implementation, the driver can be built by discrete components.

In accordance with embodiments, the CFL ballast driver can be housed within a capper of a compact fluorescent lamp. The CFL includes a lamp base including an exterior surface having first and second line voltage contacts and a neutral line voltage contact, an arc tube located distal from the lamp base, and a capper located adjacent to the lamp base.

DETAILED DESCRIPTION

Figure 1:
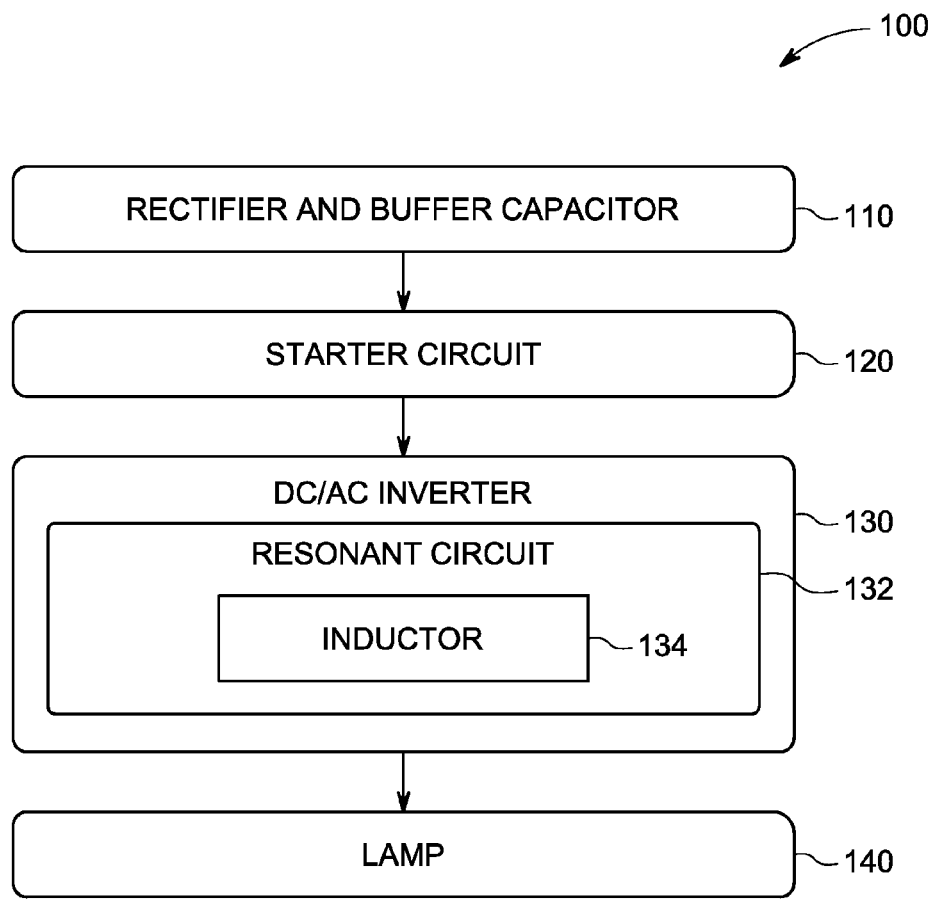
FIG. 1 depicts a block diagram of a conventional compact fluorescent lamp (CFL) ballast circuit.

FIG. 1 depicts a block diagram of conventional CFL ballast circuit 100. The conventional ballast circuit includes full wave rectifier stage 110 with a buffer capacitor. Starter circuit 120 charges a capacitor to a threshold voltage of a diac, which when conducting provides input to a half bridge (H-bridge) circuit. DC/AC inverter 130 generates a high frequency signal for the fluorescent lamp. The DC/AC inverter circuit includes resonant circuit 132 and inductor 134, which generates an amplified voltage to trigger fluorescent lamp 140 to ignite.

Figure 2:
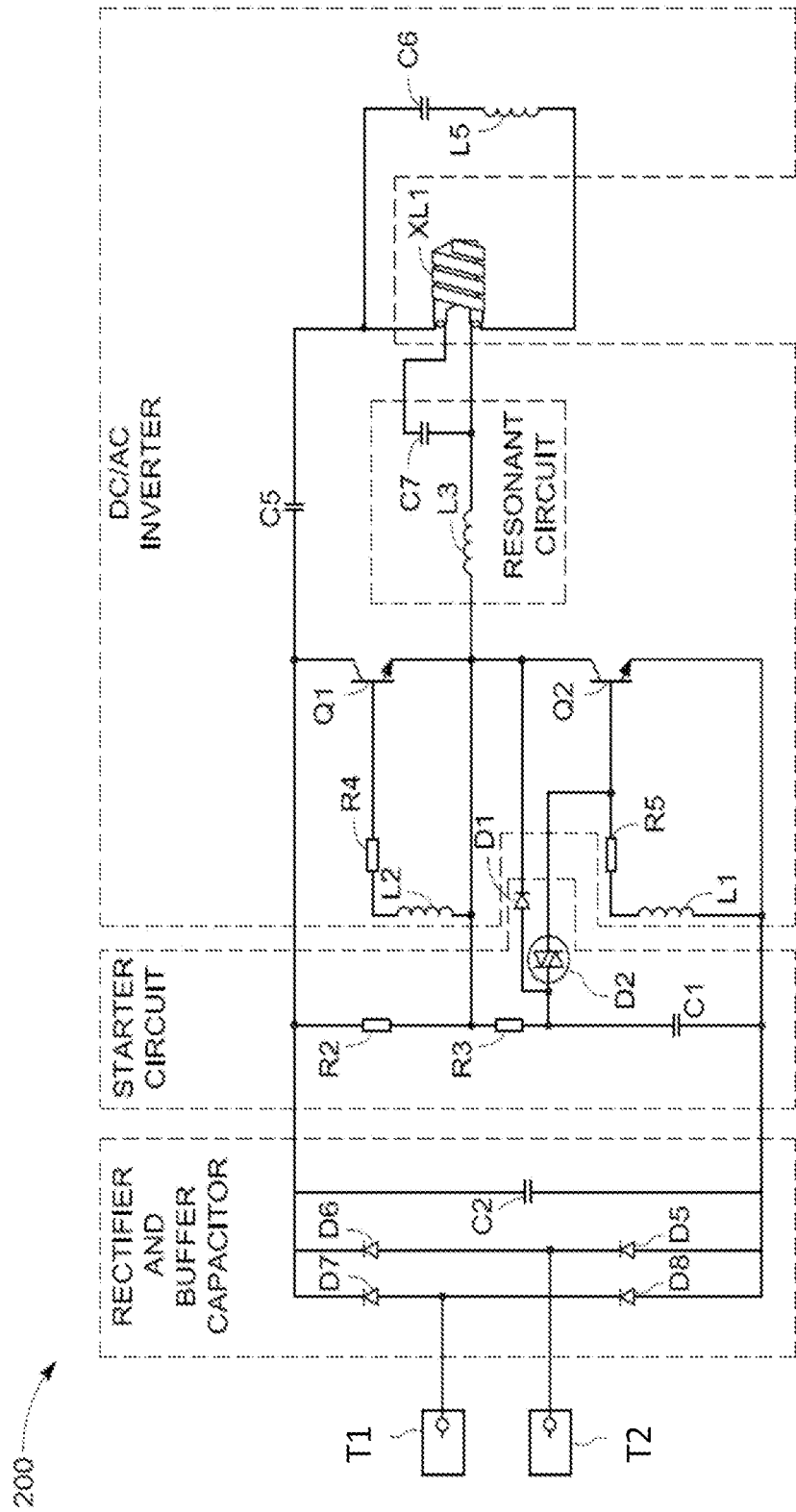
FIG. 2 schematically depicts a conventional CFL ballast circuit.

FIG. 2 schematically depicts conventional CFL ballast circuit 200. Circuit 200 is an implementation of the block diagram depicted in FIG. 1. A full wave rectifier formed by diodes D5, D6, D7, D8 conditions AC input line voltage from terminals T1, T2 into a DC voltage. Capacitor C2 buffers the output of the full wave rectifier.

The starter circuit starts the H-bridge circuit that provides a voltage to the CFL during each half cycle of the line voltage. Capacitor C1 charges to the threshold voltage of diac D2 through resistors R2, R3. Capacitor C1 discharges through diac D2 to the base of solid state switch Q2. Diode D1 prevents capacitor C1 from getting charged on the threshold voltage of diac D2 again for every second half-period (which is when solid state switch Q2 is conducting).

A DC/AC inverter generates a high frequency (about 50 kHz) AC signal for the fluorescent lamp. As the starter circuit triggers solid state switch Q2 into conduction, current starts to flow from positive supply voltage Vdd through capacitors C5, C6, C7, inductors L5, L3 and solid state switch Q2 to negative supply voltage Vss. Inductors L1, L2, L5 are coiled on the same saturable ring core transformer, where inductor L5 is the primary winding and inductors L1, L2 are secondary windings. This ring transformer generates the base-emitter voltage for solid state switches Q1, Q2 to control the H-bridge circuit.

When current flows through inductor L5, voltage gets induced on the base of solid state switches Q1, Q2 with opposite polarity. Solid state switch Q2 stays opened, solid state switch Q1 is closed until the ring core gets saturated. After saturation of the ring core, solid state switch Q2 closes, and current stops flowing through inductor L5. This stop of current flow causes an opposite polarity voltage on the secondary windings (inductors L1, L2), which causes solid state switch Q1 to open, with solid state switch Q2 remaining closed until the next saturation of the ring core. This process is repeated about every 20 us (i.e., about 50 kHz), producing a square wave with about a 50% duty cycle applied to the output of the half bridge (the emitter of solid state switch Q1, and the collector of solid state switch Q2).

The resonant circuit includes inductor L3 and capacitor C7. The values of inductor L3 and capacitor C7 are calculated to have a resonant frequency equal to the frequency of the square wave. Without an ignited CFL XL1, the quality factor of the resonant circuit is very high. When current starts to flow through the resonant circuit, an amplified voltage starts to appear on the terminals of capacitor C7. After a few periods this voltage reaches the ignition voltage of the CFL, and CFL XL1 ignites. Once the CFL ignites, the resonant circuit's quality factor decreases causing inductor L3 to function as a choke.

Figure 3:
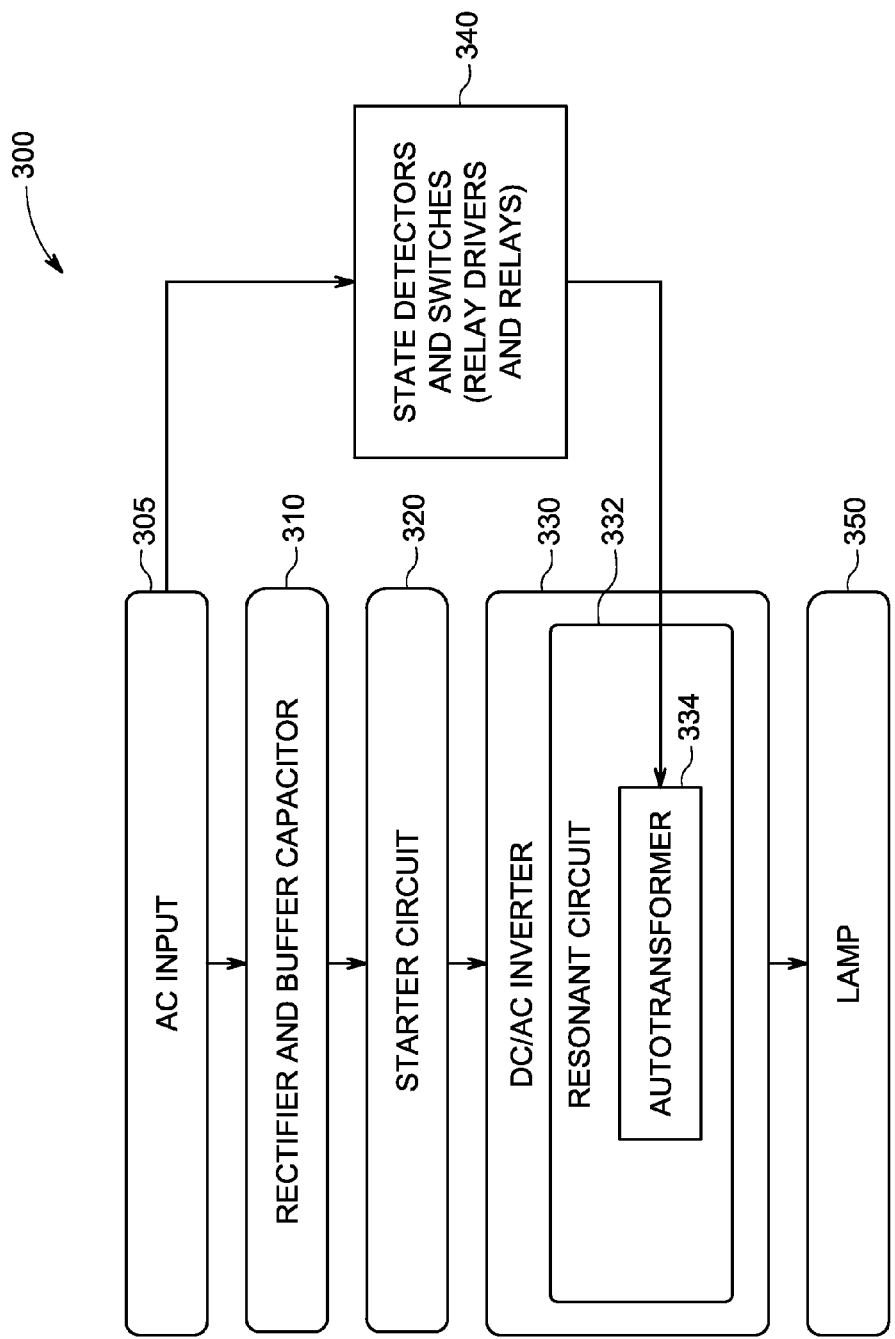
FIG. 3 depicts a block diagram of a three-way CFL ballast circuit in accordance with embodiments.

FIG. 3 depicts a block diagram of three-way CFL ballast circuit 300 in accordance with embodiments. CFL ballast circuit 300 includes AC input 305 with three terminals. These three terminals are connected to a three-way switch (not shown) located, for example, in a lamp socket. The three-way switch is operable by a user to select the output level of the CFL. The three-way switch has four positions. Starting from the 'off' position, the switch can sequentially connect power to a first terminal of AC input 305, then to another terminal, and then to both terminals. The third terminal of AC input 305 is the neutral line.

The three-way CFL ballast can include rectifier and buffer capacitor 310. The rectifier stage can be a full wave rectifier. In accordance with embodiments, rectifier stage is expanded to include additional rectifiers (e.g., diodes) in a separate branch to accommodate the additional input line. Starter circuit 320 charges a capacitor to a threshold voltage of a diac, which when conduction provides input to an H-bridge circuit. DC/AC inverter 330 generates a high frequency signal for the fluorescent lamp. The DC/AC inverter circuit includes resonant circuit 332 and inductor 334, which generates an amplified voltage to trigger fluorescent lamp 350 to ignite.

CFL ballast circuit 300 includes state detector circuit(s) and switches 340. The state detector circuits are implemented to determine the state of the three-way switch in the fixture. The switches (e.g., relay drivers and relays) control the choke inductor on the output of the H-bridge, which increases and/or decreases the voltage driving CFL lamp 350.

Figure 4:
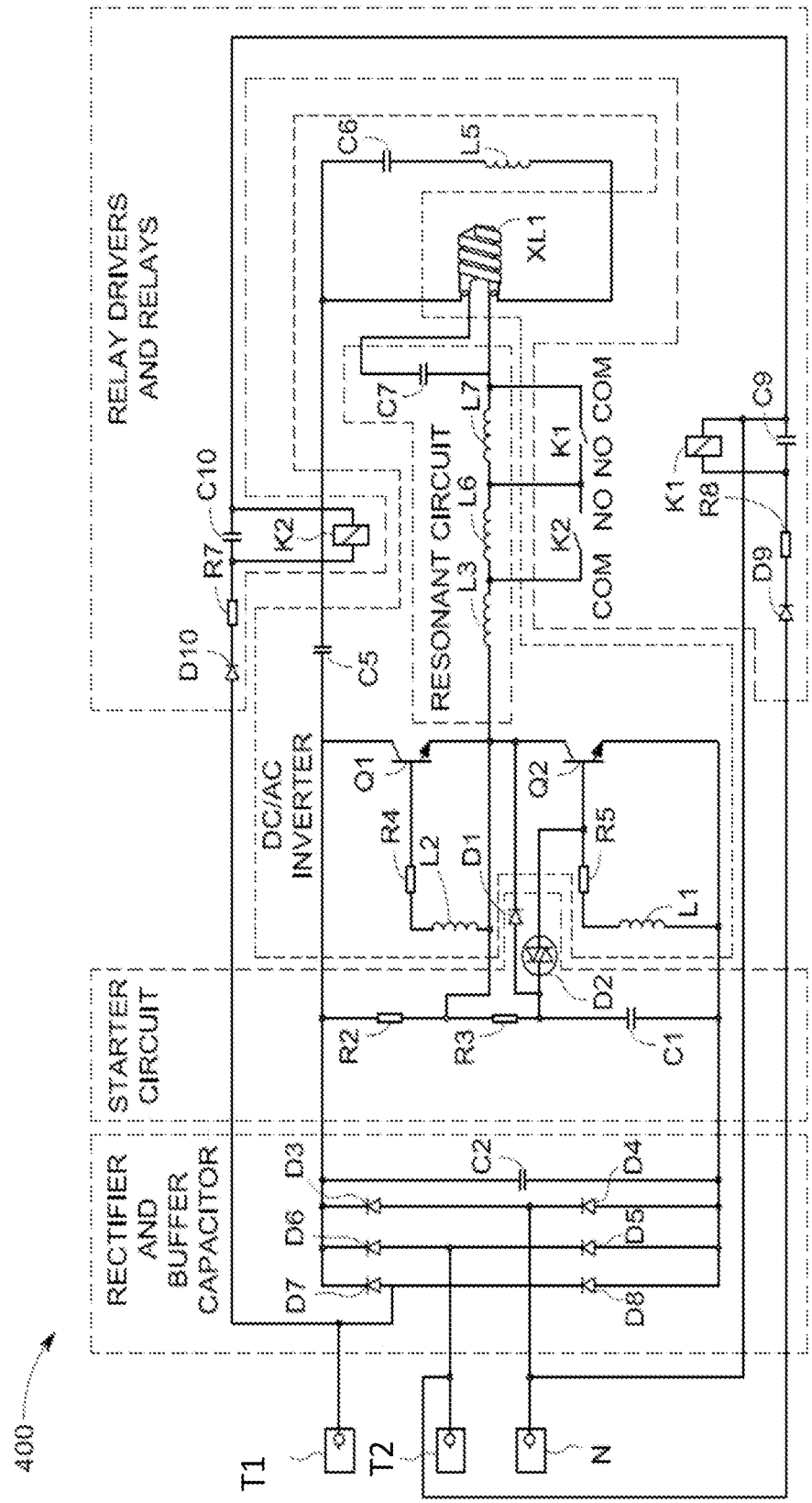
FIG. 4 schematically depicts a three-way CFL ballast circuit in accordance with embodiments.

FIG. 4 schematically depicts three-way CFL ballast circuit 400 in accordance with embodiments. Three-way CFL ballast circuit 400 is an implementation of the block diagram depicted in FIG. 3. A full wave rectifier formed by diodes D3, D4, D5, D6, D7, D8 conditions AC input line voltage from terminals T1, T2, N into a DC voltage. Capacitor C2 buffers the output of the full wave rectifier.

The starter circuit starts the H-bridge circuit that provides a voltage to the CFL during each half cycle of the line voltage. Capacitor C1 charges to the threshold voltage of diac D2 through resistors R2, R3. Capacitor C1 discharges through diac D2 to the base of solid state switch Q2. Diode D1 prevents capacitor C1 from getting charged on the threshold voltage of diac D2 again for every second half-period (which is when solid state switch Q2 is conducting).

A DC/AC inverter generates a high frequency AC signal (about 50 kHz) for the fluorescent lamp. As the starter circuit triggers solid state switch Q2 into conduction, current starts to flow from positive supply voltage Vdd through capacitors C5, C6, C7, inductors L5, L3, L6, L7 and solid state switch Q2 to negative supply voltage Vss. Inductors L1, L2, L5 are coiled on the same saturable ring core transformer, where inductor L5 is the primary winding and inductors L1, L2 are secondary windings. This ring transformer generates the base-emitter voltage for solid state switches Q1, Q2 to control the H-bridge circuit.

When current flows through inductor L5, voltage gets induced on the base of solid state switches Q1, Q2 with opposite polarity. Solid state switch Q2 stays opened, solid state switch Q1 is closed until the ring core gets saturated. After saturation of the ring core, solid state switch Q2 closes, and current stops flowing through inductor L5. This stop of current flow causes an opposite polarity voltage on the secondary windings (inductors L1, L2), which causes solid state switch Q1 to open, with solid state switch Q2 remaining closed until the next saturation of the ring core. This process is repeated about every 20 us (i.e., about 50 kHz), producing a square wave with about a 50% duty cycle applied to the output of the H-bridge (i.e., the emitter of solid state switch Q1, and the collector of solid state switch Q2).

In accordance with embodiments, the resonant circuit includes inductors L3, L6, L7 and capacitor C7. Inductors L3, L6, L7 are implemented as an autotransformer. The taps of the autotransformer are switched into the resonant circuit based on the detected state of the three-way switch. The values of inductor L3, L6, L7 and capacitor C7 are calculated to have a resonant frequency equal to the frequency of the square wave. Without an ignited CFL XL1, the quality factor of the resonant circuit is very high. When current starts to flow through the resonant circuit, an amplified voltage starts to appear on the terminals of capacitor C7. After a few periods this voltage reaches the ignition voltage of the CFL, and CFL XL1 ignites. Once the CFL ignites, the resonant circuit's quality factor decreases causing inductors L3, L6, L7 to function as a choke inductor.

The value of the choke inductor is modified by switching inductors L6, L7 in and out of the circuit based on the setting of the three-way switch in the fixture. Based on the three-way switch status, relays K1, K2 are opened and/or closed. When closed the corresponding inductor is shunted from the resonant circuit. Diodes D9, D10, resistors R7, R8 and capacitors C9, C10 form two half wave rectifiers that provide power to the relays.

For example, starting with the three-way switch in the off position, there is no AC input line voltage on either of terminals T1, T2 (FIG. 4). Operation of the three-way switch can connect line voltage to a first terminal (i.e., either of terminals T1, T2), then to a second terminal (i.e., the other of terminals T1, T2), and then to both of terminals T1, T2. With line voltage connected to the first terminal, the corresponding half wave rectifier provides DC voltage to its relay, which in turn shunts out a portion of the autotransformer winding (i.e., one of inductor L6, L7) from the resonant circuit. With line voltage connected to the second terminal, the corresponding half wave rectifier provides DC voltage to its relay, which in turn shunts out a different portion of the autotransformer winding (i.e., the other of inductor L6, L7) from the resonant circuit. With line voltage present on both of terminals T1, T2, both relays are activated and both portions of the autotransformer are shunted from the resonant circuit. In this manner, CFL XL1 is provided with three voltage levels and produces three different lumen output levels.

Figure 5:
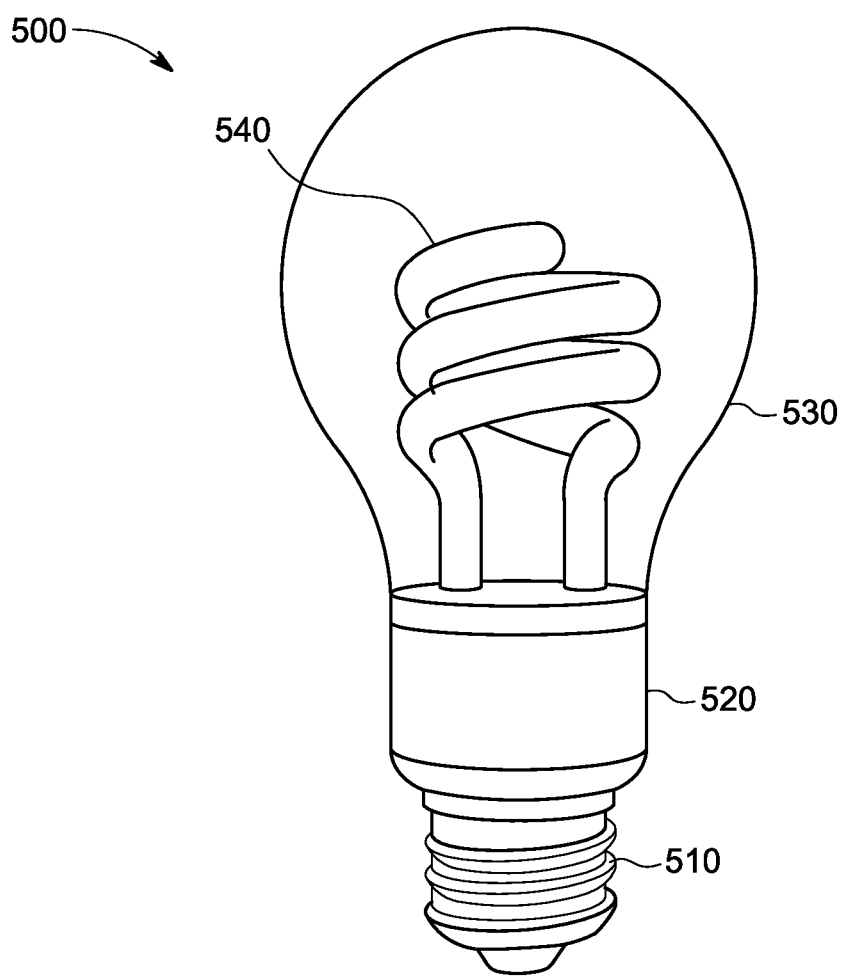
FIG. 5 depicts a three-way CFL in accordance with embodiments.

FIG. 5 depicts three-way CFL 500 in accordance with some embodiments. Three-way CFL 500 includes lamp base 510, which includes two AC line voltage input contacts and a neutral contact on an exterior surface of the lamp base. When three-way CFL 500 is installed into a three-way socket, these contacts electrically mate with corresponding contacts in the three-way socket. Also included in the three-way CFL are capper 520 and optical housing 550. Housed within optical housing 550 is CFL arc tube 540. A three-way CFL ballast circuit in accordance with embodiments can be housed within capper 520.

Three-way CFL 500 is depicted as having the form of a conventional incandescent lamp. However, other implementations of three-way CFL 500 having different forms are within the scope of this disclosure. In accordance with embodiments, three-way CFL 500 need not include optical housing 550.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A compact fluorescent lamp (CFL) ballast driver comprising:
a first and a second AC voltage terminal, and a neutral AC voltage terminal;

a full wave rectifier electrically coupled between the first AC voltage terminal and the neutral AC input terminal;

the full wave rectifier including a branch electrically coupled between the second AC voltage terminal and the neutral AC input terminal;

a resonator circuit including at least two inductors, and configured to provide an output voltage to a CFL lamp;

a first state detector circuit configured to monitor the first AC voltage terminal;

a second state detector circuit configured to monitor the second AC voltage terminal;

the first and the second state detector circuits configured to activate respective first and second switches;

the first switch configured to shunt one inductor of the resonator circuit; and the second switch configured to shunt another inductor of the resonator circuit.

2. The CFL ballast driver of claim 1, wherein the resonator circuit includes an autotransformer.

3. The CFL ballast driver of claim 1, wherein the first state detector circuit is a first rectifier electrically coupled to the first AC voltage terminal; and the second state detector circuit is a second rectifier electrically coupled to the second AC voltage terminal.

4. The CFL ballast driver of claim 3, wherein the first and the second rectifiers are half wave rectifiers.

5. The CFL ballast driver of claim 1, further including:

a starter circuit electrically coupled to the full wave rectifier, and having an output electrically coupled to a DC-to-AC converter;

the DC-to-AC converter configured to provide a trigger voltage to the resonant circuit.

6. The CFL ballast driver of claim 5, wherein the DC-to-AC converter is a half bridge circuit.

7. A compact fluorescent lamp comprising:

a lamp base including an exterior surface having first and second line voltage contacts and a neutral line voltage contact;

a compact fluorescent lamp (CFL) arc tube located distal from the lamp base;

a capper located adjacent to the lamp base;

a three-way CFL ballast circuit housed within the capper;

the three-way CFL ballast circuit including:

a first state detector circuit configured to monitor the first line voltage contact;

a second state detector circuit configured to monitor the second line voltage contact; and the first and the second state detector circuits configured to activate respective first and second switches;

a resonator circuit including at least two inductors, and configured to provide an output voltage level;

the first switch configured to shunt one inductor of the resonator circuit;

the second switch configured to shunt another inductor of the resonator circuit; and wherein output voltage level of the three-way CFL ballast circuit is varied based on the activation of the first and the second switches.

8. The CFL of claim 7, wherein the three-way CFL ballast circuit includes a first terminal, a second terminal, and a third terminal, the first and the second terminal respectively electrically coupled to the first and the second line voltage contacts and the third terminal electrically coupled to the neutral line voltage contact.

9. The CFL of claim 8, wherein the three-way CFL ballast circuit includes:

a full wave rectifier electrically coupled between the first AC voltage terminal and the neutral AC input terminal; and the full wave rectifier including a branch electrically coupled between the second AC voltage terminal and the neutral AC input terminal.

10. The CFL of claim 8, wherein the three-way CFL ballast circuit includes:

a starter circuit electrically coupled to the full wave rectifier, and having an output electrically coupled to a DC-to-AC converter; and the DC-to-AC converter is configured to provide a trigger voltage to a resonant circuit.

11. The CFL of claim 7, wherein the resonator circuit includes an autotransformer.

12. The CFL of claim 7, wherein the first state detector circuit is a first rectifier electrically coupled to the first voltage contact; and the second state detector circuit is a second rectifier electrically coupled to the second voltage contact.

13. The CFL of claim 12, wherein the first and the second rectifiers are half wave rectifiers.

14. The CFL of claim 10, wherein the DC-to-AC converter is a half bridge circuit.

* * * * *